H. P. WHITE
ROD AND SHAFT PACKING.
APPLICATION FILED FEB. 21, 1918.
1,326,242.
Patented Dec. 30, 1919.
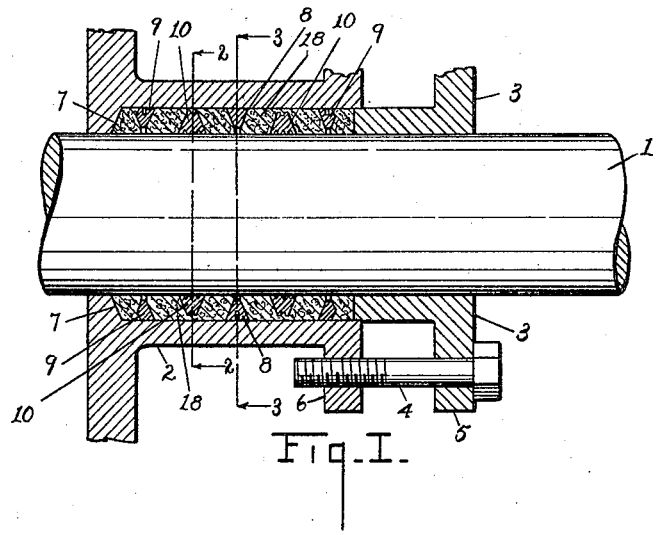
Fig. I.
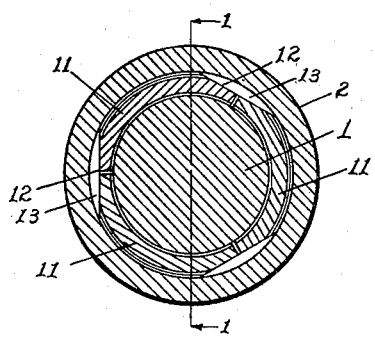
Fig. II.
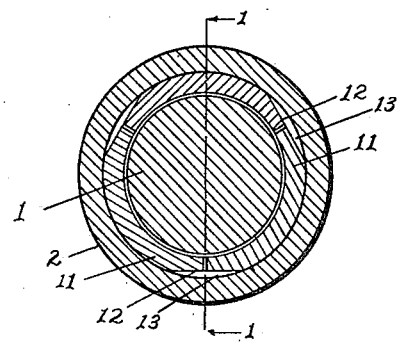
Fig. III.
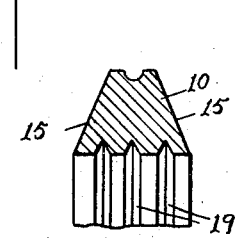
Fig. IV.
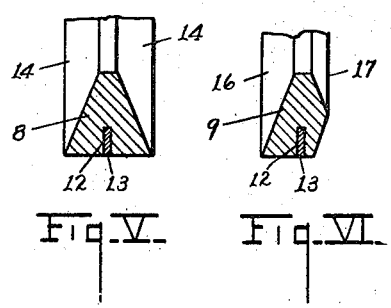
Fig. V.   Fig. VI.
Inventor
HENRY P. WHITE
Witnesses
Lynn Gilman
M. Louise Thurston
By Chappell & Earl
Attorneys

UNITED STATES PATENT OFFICE.

HENRY P. WHITE, OF KALAMAZOO, MICHIGAN, ASSIGNOR TO NEW ERA MFG. CO., INC., OF KALAMAZOO, MICHIGAN.

ROD AND SHAFT PACKING.

1,326,242. Specification of Letters Patent. Patented Dec. 30, 1919.

Application filed February 21, 1918. Serial No. 218,511.

*To all whom it may concern:*

Be it known that I, HENRY P. WHITE, a citizen of the United States, residing at the city and county of Kalamazoo, State of Michigan, have invented certain new and useful Improvements in Rod and Shaft Packings, of which the following is a specification.

This invention relates to improvements in rod and shaft packing.

The main objects of this invention are:

First, to provide an improved packing well adapted for use on reciprocating, oscillating, or rotating rods and shafts.

Second, to provide an improved packing which is efficient for use in steam, water, oil, gas, or chemicals, and is at the same time economical and durable.

Third, to provide an improved packing permitting of sufficient lateral motion to compensate for shafts or rods that are somewhat out of alinement.

Fourth, to provide an improved packing which may be installed without disconnecting either end of the rod or shaft.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a detail view partially in section on a line corresponding to line 1—1 of Figs. II and III of a packing embodying the features of my invention.

Fig. II is a transverse section on a line corresponding to line 2—2 of Fig. I.

Fig. III is a transverse section on a line corresponding to line 3—3 of Fig. I.

Figs. IV, V and VI are detail views showing cross sections of the three forms or types of rings employed by me in the packing illustrated.

In the drawing, similar reference characters refer to similar parts throughout the several views and the sectional views are taken looking in the direction of the little arrows at the ends of the section lines.

Referring to the drawing, 1 represents the shaft or rod to be packed; 2 the stuffing box, and 3 the gland thereof. The gland in the structure illustrated is adjusted by means of bolts 4 arranged through ears 5 and 6 on the gland and box respectively. These parts may be of the usual construction.

I provide a plurality of packing rings 8, 9 and 10. These packing rings are formed of segmental sections 11 having kerfs 12 therein adapted to receive the flat dowels 13 which permit the expansion and contraction of the rings into the box or onto the shaft or rod.

In the packing illustrated there is but one ring 8 and this is arranged to expand or fit within the box and is centrally disposed. The sides 14 of this ring 8 converge inwardly. At each side of the ring 8 and spaced therefrom are rings 10. These rings 10 are contractible upon the shaft or rod and their sides 15 converge outwardly. The rings 9 are arranged at the outside of and spaced from the rings 10 and are expansible into the box. The inner sides 16 of these rings 9 are inclined inwardly, while their outer sides 17 are angled. Compressible packings 18 are arranged between the rings and between the inner end of the box and the gland and the rings 9. The inner edges of the rings 8 and 9 which fit within the box are spaced from the shaft, while the outer edges of the rings 10 which fit the shaft are spaced from the box. This allows limited lateral movement of the shaft or rod. The rings 10 preferably have annular grooves 19 therein which operate as condensers thereby resisting the passage of the steam and reducing the factor of friction. It will be noted that the inclined faces of the rings are so disposed that when the packings 18 are compressed they tend to force the rings 8 and 9 against the walls of the boxing, that is, to expand them and contract or force the rings 10 against the shaft, and that, owing to the shape of the adjacent faces of the rings, the compressible packing is forced into effective contact with both the box and the shaft.

I preferably employ in this connection the compressible self lubricating metallic packing known to the trade as "New Era," as this material has great wearing as well as effective lubricating qualities. The packing rings being sectional may be introduced into the packing without the necessity for freeing the end of the shaft or rod.

My improved packing is very efficient as a packing for oil, water, steam, or chemicals, and is very durable.

I have illustrated and described one very effective embodiment of my invention. I have not attempted to illustrate other adaptations and embodiments as I believe the disclosure made will enable those skilled in the art to which my invention relates to embody or adapt the same as may be desired.

Having thus described my invention, what I claim as new and desire to secure by Letters Patent, is:

1. In a packing, the combination with a rod or shaft and a stuffing box and gland therefor, of a centrally disposed packing ring fitting the box and having inwardly converging sides, packing rings disposed at each side thereof and fitting the rod or shaft and having outwardly converging sides, outer packing rings fitting the box and having inwardly inclined inner sides and angular outer sides, said several packing rings being formed of segmental sections having joint dowels permitting expansion and contraction, and compressible packings disposed between said packing rings and between the outer rings and the end of the box and gland.

2. In a packing, the combination with a rod or shaft and a stuffing box, of an expansible packing ring fitting the box and having inwardly converging sides, a contractible packing ring fitting the rod or shaft and having outwardly converging sides, the ring fitting the box being out of contact with the shaft and the ring fitting the shaft being out of contact with the box, and a compressible packing of substantial body disposed between the inclined sides of said rings and engaging both the shaft and the box whereby when end pressure is applied the packing rings are held to the members to which they are fitted and out of engagement with the opposed members and the packings are forced into bearing engagement with both members.

3. In a packing, the combination of a rod or shaft and a stuffing box, of a packing ring fitting the box and having inwardly converging sides, a packing ring fitting the shaft and having outwardly converging sides, the ring fitting the box being out of contact with the shaft and the ring fitting the shaft being out of contact with the box, said rings being formed of sections having joint dowels permitting expansion and contraction, and compressible self-lubricating metallic packings of substantial body disposed between said rings and engaging both the shaft and the box.

4. In a packing, the combination of a rod or shaft and a stuffing box, of a plurality of packing rings having spaced similarly inclined opposed faces, alternate rings fitting the box and shaft respectively, the rings fitting the shaft being out of contact with the box and the rings fitting the box being out of contact with the shaft, said rings being formed of sections permitting expansion and contraction of the rings, and compressible packings of substantial body disposed between the rings and engaging both the shaft and the box.

5. In a packing, the combination of a rod or shaft and a stuffing box, of a plurality of packing rings having spaced similarly inclined opposed faces, alternate rings fitting the box and shaft respectively, the rings fitting the shaft being out of contact with the box and the rings fitting the box being out of contact with the shaft, and compressible self lubricating metallic packings of substantial body disposed between the rings and engaging both the shafts and the box.

6. In a packing, the combination with a rod or shaft and a stuffing box, of packing rings fitting the box and having inwardly converging sides, packing rings fitting the shaft and having outwardly converging sides, the rings fitting the box and shaft being alternately disposed, the rings fitting the shaft being out of contact with the box and those fitting the box being out of contact with the shaft, and compressible self-lubricating metallic packings of substantial body disposed between the said rings and engaging both the shaft and the box.

7. In a packing, the combination with a rod or shaft and a stuffing box, of packing rings fitting the box and having inwardly converging sides, packing rings fitting the shaft and having outwardly converging sides, the rings fitting the box and shaft being alternately disposed, the rings fitting the shaft being out of contact with the box and those fitting the box being out of contact with the shaft, and compressible packings of substantial body disposed between the said rings and engaging both the shaft and the box.

In witness whereof, I have hereunto set my hand and seal in the presence of two witnesses.

HENRY P. WHITE. [L. S.]

Witnesses:
 LUELLA G. GREENFIELD,
 MARGARET L. GLASGOW.